US 6,448,973 B1

(12) United States Patent
Guo et al.

(10) Patent No.: US 6,448,973 B1
(45) Date of Patent: Sep. 10, 2002

(54) VIRTUAL TEXTURE

(75) Inventors: Baining Guo, Bellevue, WA (US); Ying-Qing Xu; Heung-Yeung Shum, both of Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/578,574

(22) Filed: May 25, 2000

Related U.S. Application Data

(63) Continuation-in-part of application No. 09/482,285, filed on Jan. 13, 2000.

(51) Int. Cl.[7] .............................................. G06T 11/40
(52) U.S. Cl. ...................................................... 345/582
(58) Field of Search ................................ 345/582, 586, 345/588

(56) References Cited

U.S. PATENT DOCUMENTS 5,956,043 A * 9/1999 Jensen .......................... 345/430
6,292,194 B1 * 9/2001 Powell, III ................... 345/430

OTHER PUBLICATIONS

A.C. Beers, M. Agrawala, N. Chaddha, Rendering from Compressed Textures, Proceedings of SIGGRAPH'96, Aug. 1996.
M. Cox, N. Bhandari, M. Shantz, Multi–Level Texture Caching for 3D Graphics Hardware, in Proceedings of the 25th International Symposium on Computer Architecture, 1998.
J.P. Lewis, Algorithms for Solid Noise Synthesis, in Computer Graphics (SIGGRAPH'89 Proceedings), vol. 23, pp. 263–270, Jul. 1989.
M. Pharr, C. Kolb, et al, Rendering Complex Scenes with Memory–Coherent Ray Tracing, Proceedings of SIGGRAPH'97, Aug. 1997.
J. Torborg, J. Kajiya, Talisman: Commodity Real–Time 3D Graphics for the PC, Proceedings of SIGGRAPH'96, Aug. 1996.
K. Perlin, An Image Synthesizer, Computer Graphics, SIGGRAPH'85 Proceedings, vol. 19, pp. 286–296, Jul. 1985.
RL Cook, L. Carpenter, E. Catmull, The Reyes Image Rendering Architecture, Computer Graphics, Proceedings of SIGGRAPH'87, Jul. 1987.
A. Fournier, D. Fussell, L. Carpenter, Computer Rendering of Stochastic Models, Communications of the ACM, 25(6):371–384, Jun. 1992.
P. Hanrahan, J. Lawson, A Language for Shading and Lighting Calculations, Computer Graphics, Proceedings of SIGGRAPH'90, Aug. 1990.
DR Peachey, Solid Texturing of Complex Surfaces, Computer Graphics, Proceedings of SIGGRAPH'85, 19(3), Jul. 1985.

* cited by examiner

*Primary Examiner*—Jeffery Brier
*Assistant Examiner*—G. F. Cunningham
(74) *Attorney, Agent, or Firm*—Merchant & Gould

(57) ABSTRACT

A structure that can be used to efficiently represent a virtual texture is disclosed. In one embodiment, a machine-readable medium has such a structure stored thereon, and includes a predetermined sample texture, and a predetermined global structure upon which the predetermined sample texture is to be overlaid in a predetermined manner. For example, a specific global structure is disclosed that includes a tiling encoding that describes a structure of a tiling, and a random block sequence that describes a predetermined number of random blocks within the sample texture that are to be pasted over the tiling to actualize the virtual texture. In such an instance, the sequence also describes locations where the blocks are to be pasted over the tiling. Also disclosed is that the structure can in some embodiments be utilized in texturing, such as procedural texturing.

21 Claims, 6 Drawing Sheets

VIRTUAL TEXTURE

RELATED APPLICATION

This application is a continuation-in-part of the application entitled "Block Based Synthesis of Texture in Computer Rendered Images," filed on Jan. 13, 2000, and assigned Ser. No. 09/482,285.

FIELD OF THE INVENTION

This invention relates generally to computerized graphics, and more particularly to applying textures to objects, such as two-dimensional and three-dimensional objects.

BACKGROUND OF THE INVENTION

Computer graphics has become a burgeoning field. To add realism to objects, such as three-dimensional and two-dimensional objects, developers frequently apply textures to the objects. For example, a object that represents a tree may have applied thereto a texture that approximates and visually represents bark, so that the object appears more realistic. The process of applying textures to objects is generally referred to as texture mapping.

Texture mapping, however, currently suffers from a number of problems. The available texture is often too small to cover the entire surface of the object, such that a simple tiling of the texture onto the object introduces visually unacceptable artifacts in the form of visible repetition. Furthermore, there frequently is no natural mapping from the texture space to the object surface, consequently resulting in the texture becoming distorted, often severely, when mapped. Texture mapping is also memory intensive, both in terms of storage and bandwidth, which impedes its utility in applications where storage and bandwidth are at a premium.

To solve this problems, the patent application of which the present application is a continuation-in-part, entitled "Block Based Synthesis of Texture in Computer Rendered Images" introduced a chaos mosaic, which is a technique for synthesizing textures with an even and visually stochastic distribution of the local features of an input texture sample. Texture synthesis utilizing the chaos mosaic results in synthesis performed orders of magnitude faster than prior art statistical sampling algorithms, and also is more memory efficient than prior art approaches.

SUMMARY OF THE INVENTION

The present invention relates to a structure that can be used to efficiently represent a virtual texture, which in one embodiment is constructed using the chaos mosaic approach of the parent application. In one embodiment, a machine-readable medium has such a structure stored thereon, and includes a predetermined sample texture, and a predetermined global structure upon which the sample texture is to be overlaid in a predetermined manner. For example, the global structure can include a tiling encoding that describes a structure of a tiling, as well as a random block sequence that describes a predetermined number of random blocks within the sample texture that are to be pasted over the tiling to actualize the virtual texture. In such an instance, the sequence also describes locations where the blocks are to be pasted over the tiling. The structure can in some embodiments be utilized in texturing, such as procedural texturing.

The virtual texture data structure of embodiments of the invention can be used for a number of different applications. For example, memory-efficient texture rendering is provided by an embodiment of the invention. The virtual texture is itself very small, and supports procedural texturing, by which textures are generated on the fly as needed. The data structure can also provide for bandwidth reduction. For example, rather than using a complete synthetic texture for an object, a virtual texture according to an embodiment of the invention that includes only a sample texture can instead be utilized, resulting in less data that needs to be transferred.

The invention includes computer-implemented methods and machine-readable media of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Example Computerized Device

Figure 1:
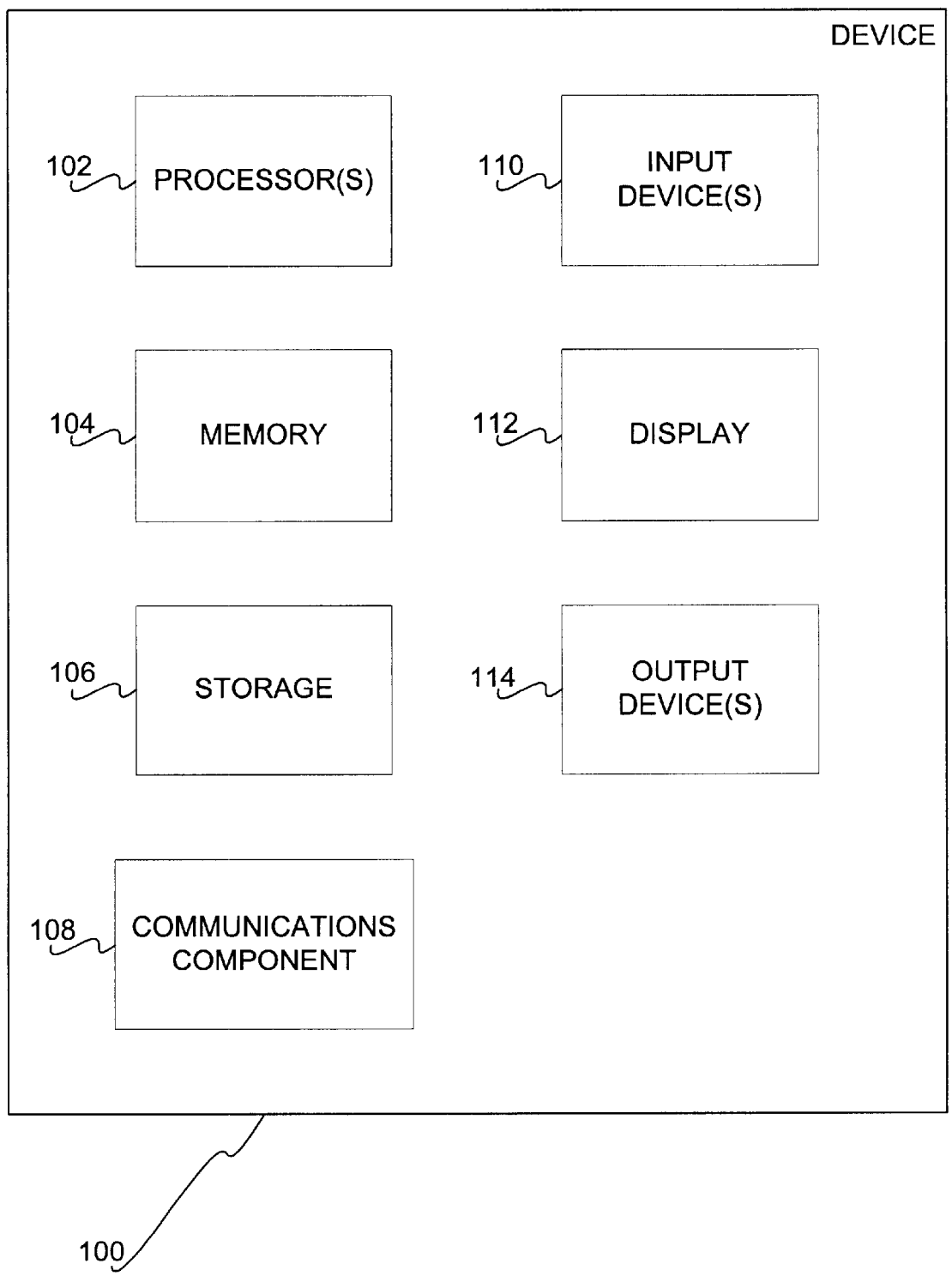
FIG. 1 is a diagram of an example computerized device in conjunction with which embodiments of the invention can be practiced.

Referring to FIG. 1, a diagram of an example computerized device 100 in conjunction with which embodiments of the invention may be practiced is shown. The example computerized device can be, for example, a desktop computer, a laptop computer, a personal digital assistant (PDA), a cell phone, etc.; the invention is not so limited. The description of FIG. 1 is intended to provide a brief, general description of a suitable computerized device in conjunction with which the invention may be implemented. For example, the computerized device of FIG. 1 can be that which performs the computerized methods and/or that which stores the data structures of embodiments of the invention, as described in further sections of the detailed description. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network.

The device 100 includes one or more of the following components: processor(s) 102, memory 104, storage 106, a communications component 108, input device(s) 110, a display 112, and output device(s) 114. It is noted, that for a particular instantiation of the device 100, one or more of these components may not be present. For example, a PDA may not have any output device(s) 114, while a cell phone may not have storage 106, etc. Thus, the description of the device 100 is to be used as an overview as to the types of components that typically reside within such a device 100, and is not meant as a limiting or exhaustive description of such computerized devices.

The processor(s) 102 may include a single central-processing unit (CPU), or a plurality of processing units, commonly referred to as a parallel processing environment. The memory 104 may include read only memory (ROM) 24 and/or random access memory (RAM) 25. The storage 106 may be any type of storage, such as fixed-media storage devices such as hard disk drives, flash or other non-volatile memory, as well as removable-media storage devices, such as tape drives, optical drives like CD-ROM's, floppy disk drives, etc. The storage and their associated computer-readable media provide non-volatile storage of computer-readable instructions, data structures, program modules and other data. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used.

Because the device 100 may operate in a network environment, such as the Internet, intranets, extranets, local-area networks (LAN's), wide-area networks (WAN's), etc., a communications component 108 can be present in or attached to the device 100. Such a component 108 may be one or more of a network card, such as an Ethernet card, an analog modem, a cable modem, a digital subscriber loop (DSL) modem, an Integrated Services Digital Network (ISDN) adapter, etc.; the invention is not so limited. Furthermore, the input device(s) 110 are the mechanisms by which a user indicates input to the device 100. Such device(s) 110 include keyboards, pointing devices, microphones, joysticks, game pads, satellite dishes, scanners, etc. The display 112 is how the device 100 typically shows output to the user, and can include, for example, cathode-ray tube (CRT) display devices, flat-panel display (FPD) display devices, etc. In addition, the device 100 may indicate output to the user via other output device(s) 114, such as speakers, printers, etc.

Overview of Texture Mapping

Figure 2:
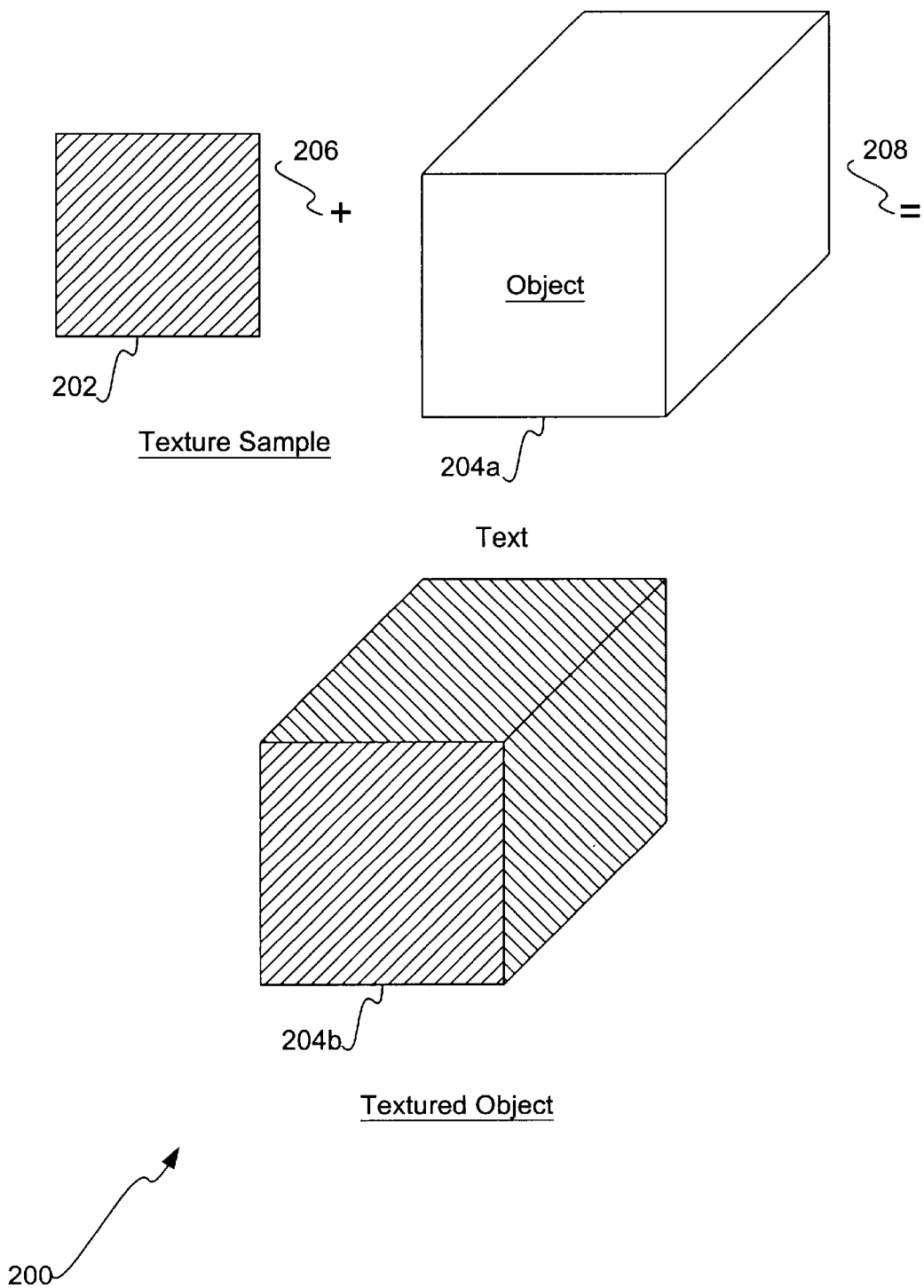
FIG. 2 is a diagram showing the mapping of a sample texture to an object, such as which can be performed in conjunction with embodiments of the invention.

In this section of the detailed description, a brief overview of texture mapping, such as can be performed in conjunction with embodiments of the invention, is presented. In the diagram 200 of FIG. 2, a texture sample 202 is applied to an object 204a to result in a textured object 204b. The texture sample 202 is generally a small graphics file that represents a texture that is desired to be mapped to the object 204a. The object 204a as shown in FIG. 2 is a three-dimensional object; however, the object can also be a two-dimensional object, for example. By using a predetermined manner, such as know within the prior art and as described in the parent application to which the current application is a continuation-in-part, the sample 202 is applied 206 to the object 204a to result 208 in the textured object 204b. The textured object 204b has the same shape as the object 204a, but has on at least its visible surfaces the pattern of the texture 202. Applying the texture 202 to the object 204a to result in the textured object 204b is referred to generally as texture mapping.

Virtual Texture Data Structure

In this section of the detailed description, a description of a virtual texture data structure according to an embodiment of the invention is provided. In general, a virtual texture V includes an input sample texture S, and a predetermined global structure M. More specifically, V can in one embodiment be a tuple (S, T, R), where T and R encode the global structure M as follows:

The tiling encoding T=(m, n, w, h) records the structure of the tiling T. The integers m and n are the numbers of tiles in the x- and y-directions, respectively, whereas w and h are the width and height of each tile.

The random block sequence $R=\{B_0, L_0, B_1, L_1, \ldots, B_{k-1}, L_{k-1}\}$ describes k random blocks within the sample texture S that are to be pasted over the tiling T and the locations to paste them. Each random block B=(x, y, w, h) defined within the sample texture S is pasted into the tiling T such that the top left corner of B is at L=(s, t).

It is noted that the random block sequence R also determines a fixed order to paste the random blocks. This order matters in one embodiment because pixels pasted later overwrite existing pixels at the same locations.

Figure 3:
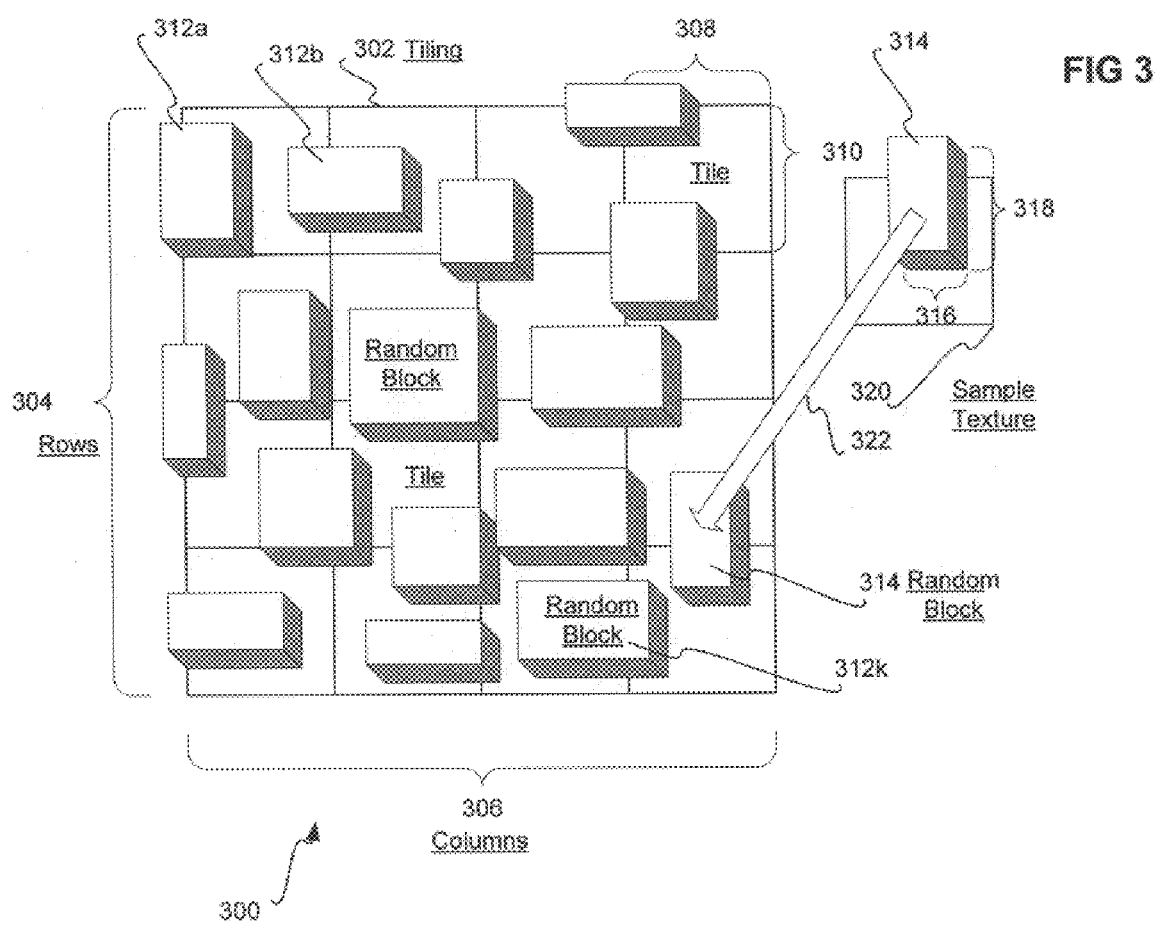
FIG. 3 is a diagram showing pictorially a virtual texture data structure according to an embodiment of the invention.

A graphical depiction of the virtual texture data structure described in the preceding paragraph is shown in the diagram 300 of FIG. 3. The tiling 302 has a number of rows of tiles 304, and a number of columns of tiles 306—four in each case as shown in FIG. 3. Furthermore, each tile has a width 308 and a height 310. Thus, the tiling encoding T corresponds to the tiling 302, such that the variables m, n, w, h correspond to the number of columns 306, the number of rows 304, the width 308, and the height 310, respectively.

With respect to the random block sequence R, there are random blocks 312a, 312b, . . . , 312k, such that there are a total of k random blocks within the data structure. The random blocks are shown in FIG. 3 as three-dimensional (3D) boxes for sake of illustrative clarity only. Each random block is defined within a sample texture 320 by its coordinates x, y within the texture 320, and a width and a height within the texture 320 given by its values for w, h. For example, the random block 314 is specifically shown in FIG. 3 as being defined on the sample texture 320 for illustrative purposes. The random block 314 has a width 316, corresponding to the value w, and a height 318, corresponding to the value h. Each random block also has a pasting location within the tiling 302 given by its coordinates s, t. Thus, each random block is pasted onto the tiling 302 such that its top left-hand corner is at a location (s, t), as measured from the top left-hand corner of the tiling 302. For example, the pasting of the random block 314 as defined on the sample texture 320 onto the tiling 302 is specifically shown in FIG. 3 by the arrow 322.

The virtual texture data structure described records the structure of the tiling and the random blocks, where for each random block, its position within the tiling as well as its position within the input sample texture is recorded. The random blocks utilized by the virtual texture data structure are a manner by which the texture sample is mapped onto the tiling of an object. The random blocks define sections within the input sample texture (via x, y, w, h), and where those sections are to be pasted within the tiling (via s, t). In one embodiment, the random blocks are determined by the chaos mosaic technique described in the parent application to which the present application is a continuation-in-part. In brief, the chaos mosaic technique provides for a random block sequence that avoids visible artifacts that can result from, for example, simple tiling of the sample texture onto the tiling of the object. The random block sequence in embodiments of the present invention can be determined in accordance with a virtual texture data structure. The virtual texture data structure provides for a random block sequence technique by which the definition of the random blocks within the sample texture, as well the spatial location of the random blocks on the tiling, are recorded.

Determining the virtual texture in one embodiment involves determining the random block sequence R, since the input sample texture S and the tiling encoding T are usually given. By selecting a random block B for each tile of the tiling T, values for the parameters x, y, w and h of the block B are implicitly set. Furthermore, the storage cost for the virtual texture can be roughly estimated. For an m×m virtual texture V with sufficiently large m, the dominant storage cost of V is that of the random block sequence R. In one embodiment, the input sample texture S is of size n×n, with n=64, 128, or 256. For such an S, a random block B=(x, y, w, h) and its location L=(s, t) will require 12 bytes. With one random block per tile of T, roughly 12 $m^2/n^2$ bytes for an m×m virtual texture is needed. It is noted that this is about $n^2/4$ smaller than an m×m complete (non-sampled) texture, with 24-bit pixels. For example, an m×m virtual texture from a 128×128 sample is 4,000 times smaller than a complete m×m virtual texture that covers the entire tiling without using a sample. Thus, the virtual texture data structure is memory efficient. Furthermore, the data structure results in significant bandwidth reduction, since less data needs to be transmitted for a given texture.

Procedural Texture Mapping Using the Virtual Texture Data Structure

In this section of the detailed description, the manner by which the virtual texture data structure can be used for texture mapping, according to one embodiment of the invention, is presented. The type of texture mapping described in this section specifically is procedural texturing, which procedurally defines a texture over an entire three-dimensional space, but which evaluates only points on the object surfaces where the texture is needed—e.g., such as those points that are actually visible. It is noted, however, that the invention is not limited to application to procedural texture mapping, and that this description is in accordance with only one embodiment of the invention.

Figure 4:
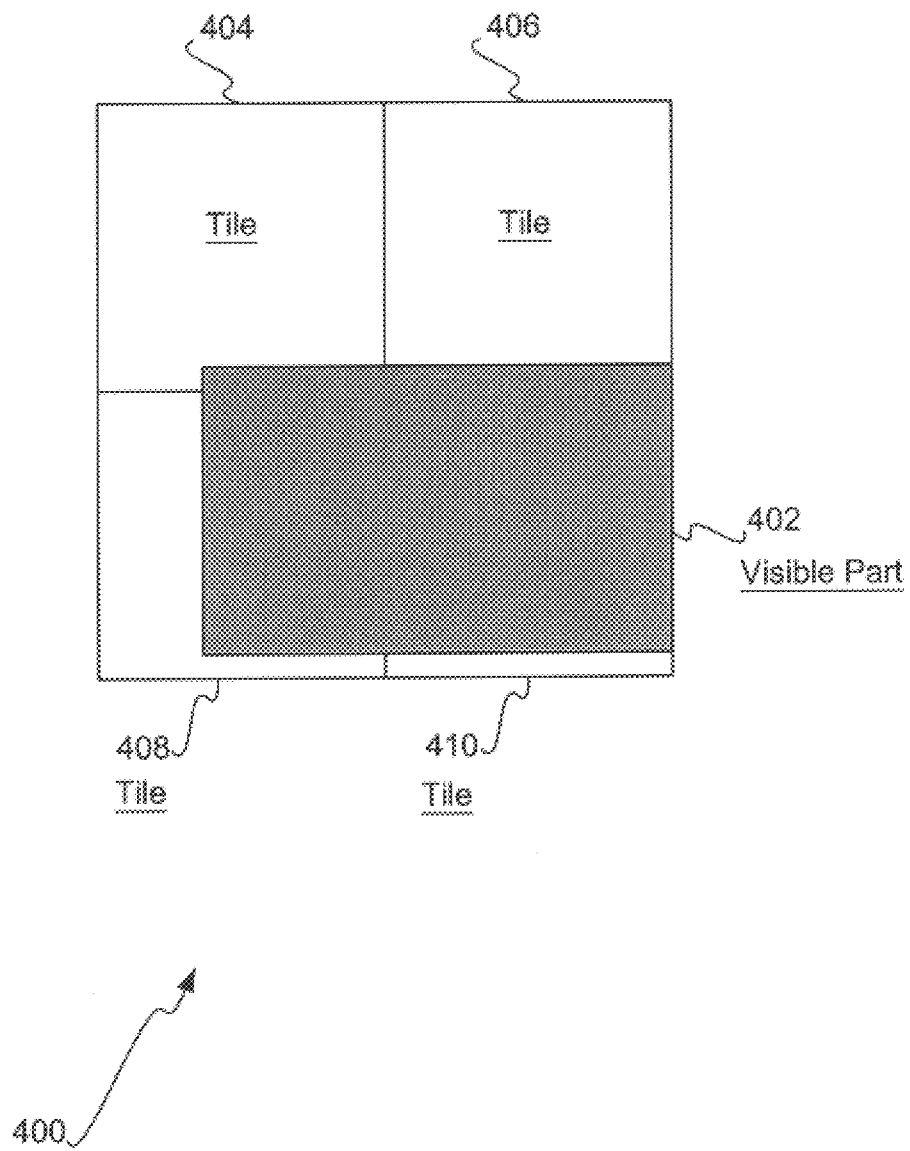
FIGS. 4 and 5 are diagrams showing how a virtual texture data structure can be used to map a texture to an object according to an embodiment of the invention; and, FIG. 6 is a flowchart of a method according to an embodiment of the invention.
Figure 5:
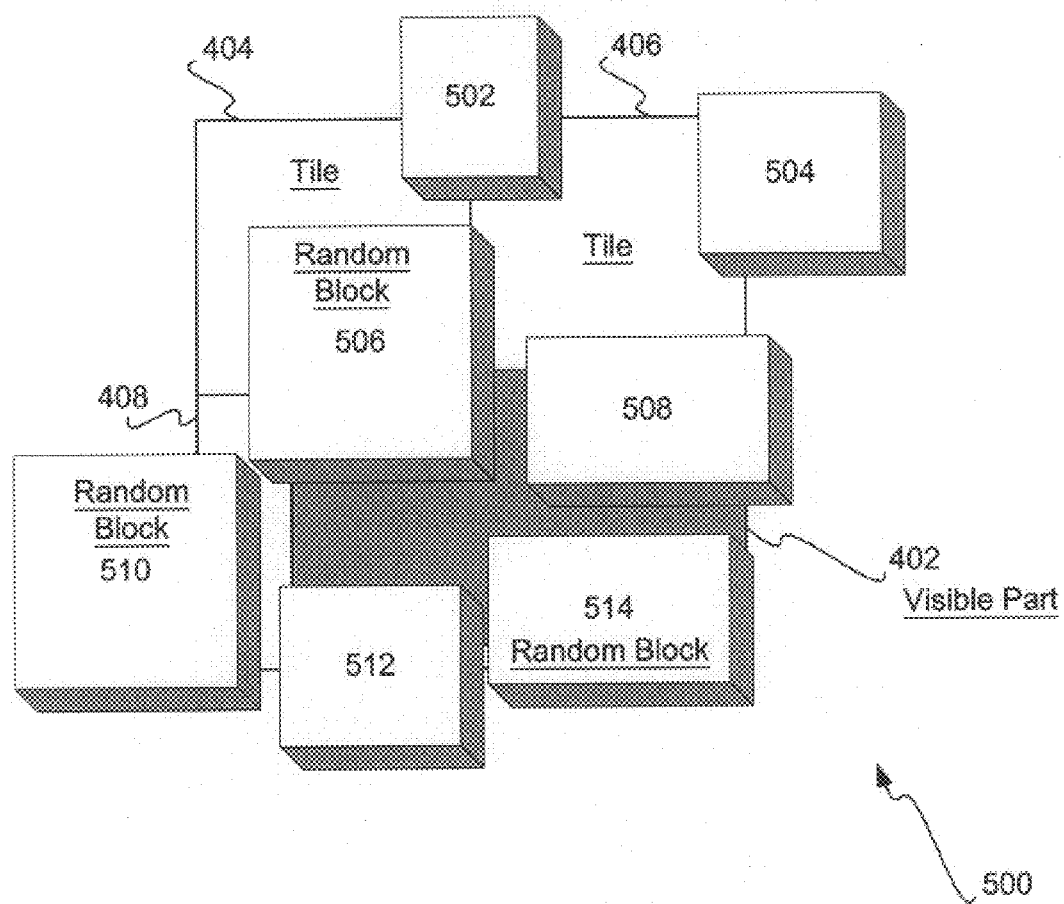

From a virtual texture V, any visible part B of an object can be quickly evaluated by examining only the tiles of the tiling T that touch the visible part B, and then pasting only the random blocks that touch these tiles. This is shown in FIGS. 4 and 5. Referring first to the diagram 400 of FIG. 4, the visible part 402 (shown as shaded in FIG. 4), touches the tiles 404, 406, 408 and 410. That is, the visible part 402 of an object only touches the tiles 404, 406, 408 and 410, such that the only random blocks that need to actually be pasted onto the tiling of the object of which the tiles 404, 406, 408 and 410 are a part are those blocks that touch these latter tiles. This is shown in the diagram 500 of FIG. 5, where only the random blocks 502, 504, 506, 508, 510, 512 and 514 need to be pasted onto the tiling, since these are the only blocks that touch the tiles 404, 406, 408 and 410 (it is noted that the tile 410 is incidentally hidden from view in FIG. 5). Thus, a procedural texturing approach can be utilized with a virtual texture data structure in one embodiment of the invention by evaluating only those random blocks that touch tiles of the tiling of the object that touch the visible portion of the object.

In another embodiment, a more efficient scheme is used for single-pixel procedural texturing evaluation. For example, consider the case when the desired pixel p is not near the boundary of a random block. Evaluating p involves determining the tile $B_p$ to which p belongs, and also the random blocks covering $B_p$. Once these random blocks are determined, the last random block covering p is found (or, it is determined that no random block covers p). Then, p is retrieved from either the last random block or from the tile $B_p$. Determining $B_p$ is a matter of indexing arithmetic, as can be appreciated by those of ordinary skill within the art. For the case where the pixel p is near the edge of a random block, more than one pixel may be needed to be evaluated to produce a filtered result as the desired pixel.

In one embodiment, procedural texturing evaluation must satisfy what is known in the art as the internal consistency requirement in order for the evaluation to be performed correctly. The internal consistency requirement states that if a given part of a synthetic texture is synthesized multiple times, the result must always be the same, which can be important when the synthetic texture is used in animation, for example. However, it is noted that the virtual texture data structure, since it is predetermined, ensures internal consistency, and thus satisfies this requirement. This is in contradistinction to existing statistical sampling methods within the prior art, which do not satisfy the internal consistency requirement, and thus are not suitable for procedural texturing.

Methods

In this section of the detailed description, methods according to varying embodiments of the invention are shown. The methods can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system, computer, or computerized device, such as that described in conjunction with FIG. 1 in a previous section of the detailed description. The invention is not so limited, however.

Figure 6:
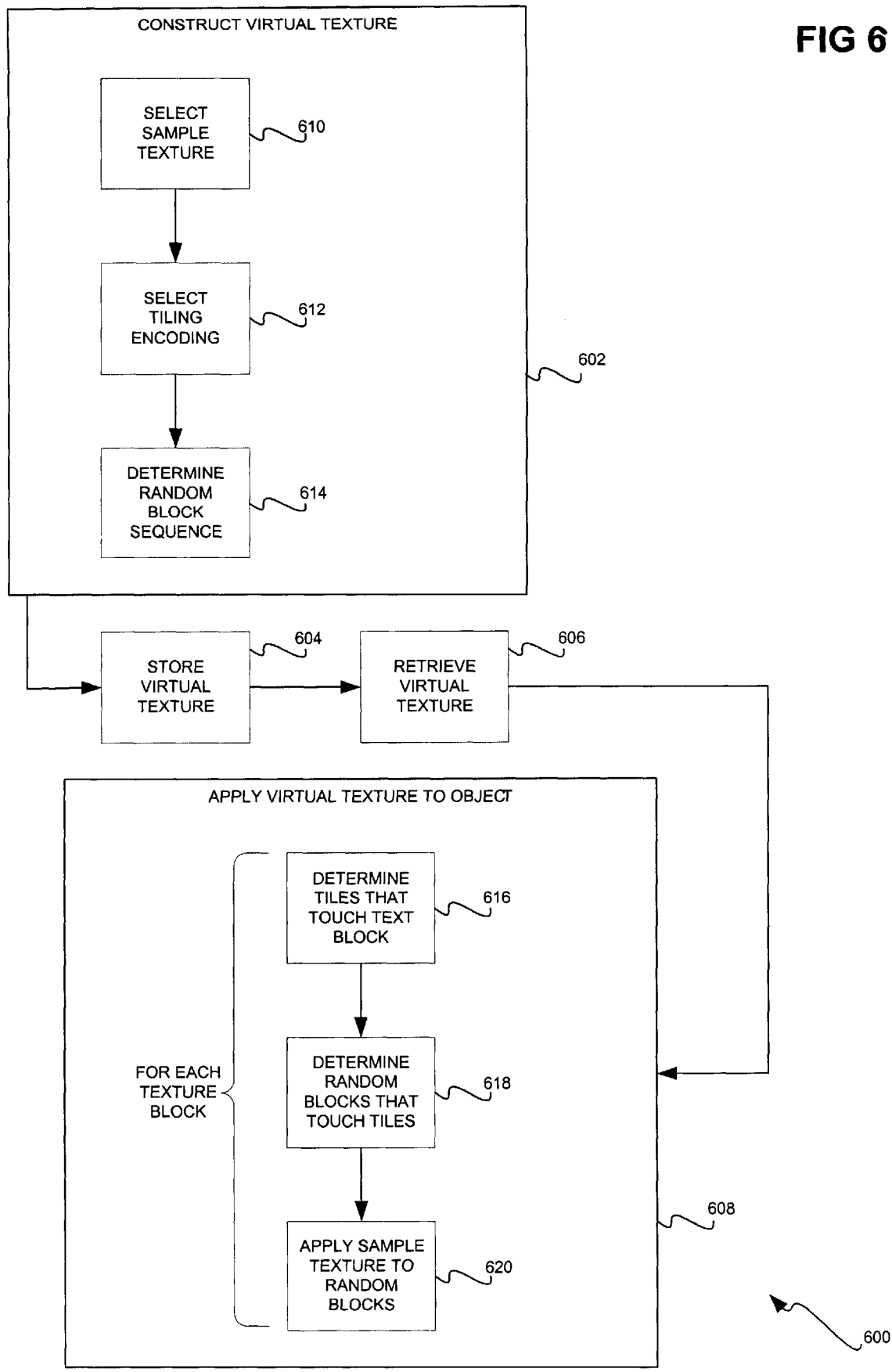

Referring to FIG. 6, a flowchart of a method 600 according to an embodiment of the invention is shown. The method has four main parts. In 602, a virtual texture data structure is constructed. This virtual texture is then stored in 604, such as on a machine-readable medium like a memory or a hard disk drive, and is then later retrieved in 606 (that is, received) in the particular embodiment of FIG. 6. In 608, the virtual texture is applied to an object. The parts 602 and 608 of the method are now described in more detail.

In 602, a virtual texture data structure can be constructed in accordance with one particular embodiment of the invention by performing 610, 612 and 614. First, in 610, a sample texture upon which the virtual texture is to be based is selected. This is the sample texture S described in previous sections of the detailed description. By having a graphics file that only represents a sample texture, as opposed to a texture for an entire tiling, for example, memory is conserved. In 612, a tiling encoding is selected that describes a structure of a tiling that corresponds to an object to which the virtual texture is to be applied. This is the tiling encoding T described in previous sections of the detailed description. Finally, in 614, a random block sequence is determined. This is the random block sequence R described in previous sections of the detailed description. The random block sequence describes a number of random blocks defined within the sample texture, that are to be pasted over the tiling of the tiling encoding to actualize the virtual texture onto an object. The sequence thus also describes locations within the tiling where the blocks are to be pasted thereover when the virtual texture is to be applied to an object.

In 608, the virtual texture can be applied to an object in accordance with one particular embodiment of the invention by performing 616, 618 and 620. In particular, 616, 618 and 620 relate to a procedural texture mapping evaluation, although the invention itself is not so limited. 616, 618 and 620 are performed for each "texture block", which is used herein to refer to each visible part of the predetermined object (for example, each contiguous visible part) to which the virtual texture is to be applied. First, in 616, the tiles of the tiling encoding that touch the texture block being evaluated are determined. In 618, the random blocks that touch these tiles are then determined. In 620, only these random blocks are pasted onto the tiling. That is, the sample texture is applied only as to these random blocks. The particular embodiment of the invention in which 616, 618 and 620 are performed is thus a relatively fast procedural texture mapping evaluation, since the object is only textured as to its visible portions.

CONCLUSION

It is noted that, although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A machine-readable medium having stored thereon a data structure for efficiently representing a virtual texture, the structure comprising:
   a predetermined sample texture; and,
   a predetermined global structure upon which the predetermined sample texture is to be overlaid in a predetermined manner wherein the predetermined global structure comprises:
      a tiling encoding that describes a structure of a tiling; and,
      a random block sequence that describes a predetermined number of random blocks within the predetermined sample texture that are to be pasted over the tiling of the tiling encoding to actualize the virtual texture, the sequence also describing locations where the predetermined number of random blocks are to be pasted over the tiling wherein the random block sequence further determines a fixed order in which the predetermined number of random blocks are to be pasted over the tiling.

2. The medium of claim 1, wherein the tiling encoding is described as (m, n, w, h), where m and n indicate a number of tiles in an x-direction and a y-direction, respectively, and where w and h indicate a width and a height, respectively, of each tile.

3. The medium of claim 1, wherein the random block sequence is described as (x, y, w, h, s, t) for each of the predetermined number of random blocks, where, for each block, s and t identify a location in which pasting of the block within the tiling encoding is to occur, x and y indicate a starting position of the block within the predetermined sample texture, and w and h indicate a width and a height, respectively, of the block.

4. A machine-readable medium having stored thereon a data structure for representing a virtual texture, the structure comprising:
   a predetermined sample texture;
   a tiling encoding that describes a structure of a tiling; and,
   a random block sequence that describes a predetermined number of random blocks within the predetermined sample texture that are to be pasted over the tiling of the tiling encoding to actualize the virtual texture, the sequence also describing locations where the predetermined number of random blocks are to be pasted over the tiling.

5. The medium of claim 4, wherein the random block sequence further determines a fixed order in which the predetermined number of random blocks are to be pasted over the tiling.

6. The medium of claim 4, wherein the tiling encoding is described as (m, n, w, h), where m and n indicate a number of tiles in an x-direction and a y-direction, respectively, and where w and h indicate a width and a height, respectively, of each tile.

7. The medium of claim 4, wherein the random block sequence is described as (x, y, w, h, s, t) for each of the predetermined number of random blocks, where, for each block, s and t identify a location in which pasting of the block within the tiling encoding is to occur, x and y indicate a starting position of the block within the predetermined sample texture, and w and h indicate a width and a height, respectively, of the block.

8. A computer-implemented method for constructing a virtual texture comprising:
   selecting a sample texture upon which the virtual texture is based;

selecting a tiling encoding that describes a structure of a tiling; and, determining a random block sequence that describes a number of random blocks within the sample texture that are to be pasted over the tiling of the tiling encoding to actualize the virtual texture, the sequence also describing locations where the number of random blocks are to be pasted over the tiling.

9. The method of claim 8, wherein determining the random block sequence comprises selecting a random block for each of a number of tiles of the tiling of the tiling encoding.

10. A computer-implemented method for texturing a predetermined object comprising:

receiving a virtual texture comprising a predetermined sample texture and a predetermined global structure upon which the predetermined sample texture is to be overlaid in a predetermined manner; and, applying the virtual texture to the predetermined object wherein applying the virtual texture to the predetermined object comprises satisfying a predetermined internal consistency requirement.

11. The method of claim 10, wherein receiving the virtual texture comprises constructing the virtual texture.

12. The method of claim 11, wherein constructing the virtual texture comprises:

selecting a sample texture upon which the virtual texture is based;

selecting a tiling encoding that describes a structure of a tiling; and, determining a random block sequence that describes a number of random blocks within the sample texture that are to be pasted over the tiling of the tiling encoding to actualize the virtual texture, the sequence also describing locations where the number of random blocks are to be pasted over the tiling.

13. The method of claim 10, wherein applying the virtual texture to the predetermined object comprises utilizing a procedural texturing approach.

14. The method of claim 13, wherein utilizing the procedural texturing approach comprises utilizing the procedural texturing approach in a pixel-wise manner.

15. The method of claim 10, wherein applying the virtual texture to the predetermined object comprises evaluating the virtual texture as to only visible portions of the predetermined object.

16. A machine-readable medium having instructions stored thereon for execution by a processor to perform a method comprising:

selecting a sample texture upon which a virtual texture is based;

selecting a tiling encoding that describes a structure of a tiling; and, determining a random block sequence that describes a number of random blocks within the sample texture that are to be pasted over the tiling of the tiling encoding to actualize the virtual texture, the sequence also describing locations where the number of random blocks are to be pasted over the tiling.

17. The medium of claim 16, wherein the method further comprises applying the virtual texture to the predetermined object.

18. The medium of claim 17, wherein applying the virtual texture to the predetermined object comprises utilizing a procedural texturing approach.

19. The medium of claim 17, wherein applying the virtual texture to the predetermined object comprises satisfying a predetermined internal consistency requirement.

20. The medium of claim 17, wherein applying the virtual texture to the predetermined object comprises evaluating the virtual texture as to only visible portions of the predetermined object.

21. A computer-implemented method for texturing a predetermined object with a virtual texture utilizing a procedural texturing approach for each visible texture block of the predetermined object, comprising:

determining one or more tiles of a tiling of the virtual texture that touch the visible texture block;

determining one or more random blocks of the virtual texture that touch the one or more tiles that touch the visible texture block;

applying a sample texture of the virtual texture to the one or more random blocks of the virtual texture that touch the one or more tiles that touch the visible texture block.

* * * * *